US011204911B2

(12) United States Patent
Jang et al.

(10) Patent No.: US 11,204,911 B2
(45) Date of Patent: Dec. 21, 2021

(54) EFFICIENT AND NON-DISRUPTIVE ONLINE DEFRAGMENTATION WITH RECORD LOCKING

(71) Applicant: SAP SE, Walldorf (DE)

(72) Inventors: Ji Hoon Jang, Seongnam-si (KR); Seungho Yoo, Seoul (KR); Yong Sik Kwon, Seoul (KR); Hyeong Seog Kim, Seoul (KR)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 16/824,933

(22) Filed: Mar. 20, 2020

(65) Prior Publication Data
US 2021/0294786 A1 Sep. 23, 2021

(51) Int. Cl.
*G06F 16/23* (2019.01)
*G06F 9/46* (2006.01)
*G06F 9/52* (2006.01)
*G06F 16/25* (2019.01)

(52) U.S. Cl.
CPC .......... *G06F 16/2343* (2019.01); *G06F 9/466* (2013.01); *G06F 9/52* (2013.01); *G06F 16/254* (2019.01)

(58) Field of Classification Search
CPC ............................ G06F 16/2343; G06F 16/254
See application file for complete search history.

(56) References Cited

U.S. PATENT DOCUMENTS

| | | | |
|---|---|---|---|
| 8,527,544 B1 * | 9/2013 | Colgrove | G06F 3/0608 707/791 |
| 10,534,749 B1 * | 1/2020 | Miah | G06F 16/128 |
| 10,789,215 B1 * | 9/2020 | Tian | G06F 16/1805 |
| 11,003,542 B1 * | 5/2021 | Kucherov | G06F 16/2365 |
| 2009/0300084 A1 * | 12/2009 | Whitehouse | G06F 12/0866 |
| 2013/0226931 A1 * | 8/2013 | Hazel | G06F 16/134 707/741 |
| 2013/0254208 A1 * | 9/2013 | Hazel | G06F 16/2272 707/741 |
| 2013/0332428 A1 * | 12/2013 | Narasayya | G06F 16/22 707/693 |
| 2014/0156610 A1 * | 6/2014 | Akers | G06F 16/1724 707/693 |
| 2015/0331755 A1 * | 11/2015 | Morgan | G06F 16/2255 707/646 |

(Continued)

*Primary Examiner* — Eliyah S. Harper
(74) *Attorney, Agent, or Firm* — Fish & Richardson P.C.

(57) ABSTRACT

Methods, systems, and computer-readable storage media for online defragmentation of memory in database systems by applying an IX-lock to each table having data stored in a marked page in a set of marked pages, generating a record map including key-value pairs, each being associated with a record location in a marked page, a value of each key-value pair initially set to a first value, iteratively executing the online defragmentation to delete data from marked pages and add the data to non-sparse pages, at least one iteration including applying a try-lock to a record in a marked page, and at iterations of the online defragmentation, updating the record map to change the value of at least one key-value pair from the first value to the second value, the second value representing that data of a marked page has been deleted from the marked page and added to a non-sparse page.

17 Claims, 10 Drawing Sheets

(56) References Cited

U.S. PATENT DOCUMENTS

| | | | |
|---|---|---|---|
| 2016/0154834 A1* | 6/2016 | Friedman | G06F 16/86 |
| | | | 707/657 |
| 2017/0068675 A1* | 3/2017 | Hazel | G06F 16/23 |
| 2017/0185625 A1* | 6/2017 | Cheru | G06F 16/1744 |
| 2017/0316028 A1* | 11/2017 | Kanteti | G06F 16/1724 |
| 2018/0217987 A1* | 8/2018 | Helland | G06F 16/24562 |
| 2018/0218022 A1* | 8/2018 | Mace | G06F 16/2343 |
| 2021/0081403 A1* | 3/2021 | Tian | G06F 3/0658 |

* cited by examiner

EFFICIENT AND NON-DISRUPTIVE ONLINE DEFRAGMENTATION WITH RECORD LOCKING

BACKGROUND

In data storage, memory fragmentation (also referred to herein as fragmentation) is a common problem. Fragmentation refers to a situation where the memory in use is less than the allocated memory. Fragmentation can be caused by instances, in which the required memory cannot be provided even though there is enough total free memory (e.g., there is insufficient continuous memory to store particular data that is to be stored). Fragmentation in database storage results in wasted memory and degrades overall data access performance. For example, fragmentation results in an increased amount of memory to be accessed to retrieve required data than a well-utilized database system (e.g., a database system with no fragmentation or less fragmentation).

Defragmentation refers to a process to reduce fragmentation. In general, defragmentation is performed by moving (deleting and inserting) data from sparse pages to dense pages, a page being a grouping of memory. Different types of defragmentation can be provided. Example types include offline defragmentation and online defragmentation. Offline defragmentation refers to a defragmentation process that is executed while the database system is offline. That is, the database system is taken out of production use (i.e., the database system is not in service and no transactions can be performed). Online defragmentation refers to a defragmentation process that is executed while the database system is online. That is, the database system continues to operate in production use (i.e., active users and workloads). Offline defragmentation runs in isolation, and there is no need to consider complex table locking, record locking or other multi-version concurrency control (MVCC). Consequently, offline defragmentation is more effective in defragmenting memory than online defragmentation. However, by its nature, offline defragmentation requires service down-time, which is not always acceptable (e.g., some database systems require availability 24/7).

In contrast, and as noted above, online defragmentation is performed while the database system is running. Consequently, online defragmentation is more complex than offline defragmentation, because locking and MVCC need to be considered. To account for this, online defragmentation typically uses table locks to guarantee that a table or a record, which is being or going to be moved by the online defragmentation process, is not manipulated by another transaction while the lock is acquired. However, in a wide sense, using table lock is not a real online operation, because all updates are blocked for the table while executing defragmentation. That is, using table locks, respective tables are effectively brought offline during the defragmentation process, and are not available for production use.

SUMMARY

Implementations of the present disclosure are directed to defragmentation of memory in database systems. More particularly, implementations of the present disclosure are directed to online defragmentation of memory in database systems.

In some implementations, actions include defining a set of marked pages including one or more sparse pages having respective data records that are to be deleted during online defragmentation, applying an intent exclusive lock (IX-lock) to each of one or more tables having data stored in a marked page in the set of marked pages, the IX-lock enabling a first set of transactions to be executed on data stored in each marked page and prohibiting a second set of transactions to be executed on data stored in each marked page, generating a record map including key-value pairs, each key-value pair being associated with a respective record location in one of the marked pages, a value of each key-value pair being initially set to a first value, iteratively executing the online defragmentation to delete data from one or more marked pages and add the data to one or more non-sparse pages, at least one iteration including applying a try-lock to a record in a marked page, and at one or more iterations of the online defragmentation, updating the record map to change the value of at least one key-value pair from the first value to the second value, the second value representing that data from a record location of a marked page has been deleted from the marked page and added to a non-sparse page. Other implementations of this aspect include corresponding systems, apparatus, and computer programs, configured to perform the actions of the methods, encoded on computer storage devices.

These and other implementations can each optionally include one or more of the following features: defining a set of marked pages includes calculating a utilization for each page of a set of used pages, each used page including at least one slot that is used for data storage, and defining a set of sparse pages based on respective utilizations, at least one sparse page in the set of sparse pages being included in the set of marked pages; the first set of transactions includes deleting data from a marked page; the second set of transactions includes allocating at least one slot in a marked page and storing data in the at least one slot; actions further include ceasing execution of the online defragmentation in response to determining that all of the key-value pairs in the record map are equal to the second value; after online defragmentation, each of the marked pages is deallocated; and the database system is in production use during execution of the online defragmentation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
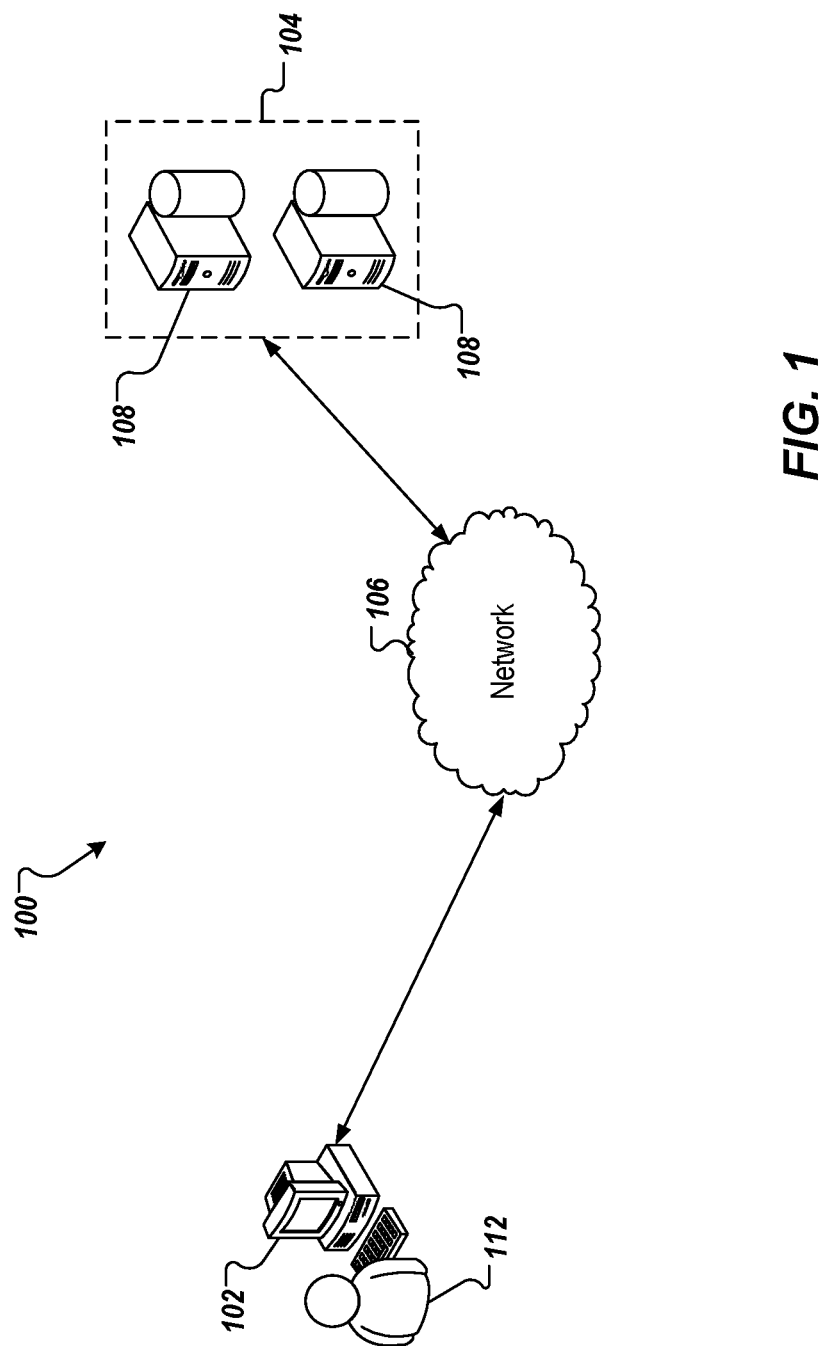
FIG. 1 depicts an example architecture that can be used to execute implementations of the present disclosure.

Implementations of the present disclosure are directed to defragmentation of memory in database systems. More particularly, implementations of the present disclosure are directed to online defragmentation of memory in database systems. Implementations can include actions of defining a set of marked pages including one or more sparse pages having respective data records that are to be deleted during online defragmentation, applying an intent exclusive lock (IX-lock) to each of one or more tables having data stored in a marked page in the set of marked pages, the IX-lock enabling a first set of transactions to be executed on data stored in each marked page and prohibiting a second set of transactions to be executed on data stored in each marked page, generating a record map including key-value pairs, each key-value pair being associated with a respective record location in one of the marked pages, a value of each key-value pair being initially set to a first value, iteratively executing the online defragmentation to delete data from one or more marked pages and add the data to one or more non-sparse pages, at least one iteration including applying a try-lock to a record in a marked page, and at one or more iterations of the online defragmentation, updating the record map to change the value of at least one key-value pair from the first value to the second value, the second value representing that data from a record location of a marked page has been deleted from the marked page and added to a non-sparse page.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system (e.g., SAP HANA). Further, the server system 104 can execute the online defragmentation of memory in database systems of the present disclosure, as described in further detail herein.

To provide further context for implementations of the present disclosure, and as introduced above, memory management schemes are used in database systems to manage storage of data in computer-readable/-writable memory (referred to as memory herein). In some examples, data is stored in tables within the database system, each table including columns and rows. In some examples, each column represents a respective field, and each row is a record that includes values for the field(s) (e.g., a value is stored in each cell corresponding to a respective field-row pair). By way of non-limiting example, an example portion of a table is depicted below in Table 1.

TABLE 1

Example Portion of Example Table

| Customer Name | Country | Account No. |
| --- | --- | --- |
| Acme Ltd. | US | 1234 |
| Corp. AG | DE | 4321 |
| ... | ... | ... |

In the example of Table 1, example fields include Customer Name, Country, and Account No., and row values include Acme Ltd., US, 1234, Corp. AG, DE, and 4321.

Each table of the database system is stored in memory using a table store mode. Example table store modes include row store (RowStore) and column store (ColumnStore). Implementations of the present disclosure are described in further detail herein with reference to row store. Using row store, values are stored sequentially in an array of blocks of memory. For example, memory can be described as a continuous array of blocks, each block storing a single value of data (e.g., a value from a cell of a table). Each row of data is stored one after another in sequence along the array of blocks. Again, using Table 1 as a non-limiting example, row store of the values of Table 1 would result in the following example sequence of blocks in memory:

| ... | Acme Ltd. | US | 1234 | Corp. AG | DE | 4321 | ... |
| --- | --- | --- | --- | --- | --- | --- | --- |

Example Memory Array

Although the example memory array above is associated with a fixed length memory area, it is contemplated that, for variable length data, a variable length memory area can be implicated. In some examples, a record including both fixed length data and variable length data can be stored in multiple memory areas (e.g., both fixed length memory area and variable length memory area). Different table store modes have different characteristics. For example, although having a greater memory footprint, row store enables more rapid transaction (e.g., query) processing and more rapid writing to memory than column store.

During operation of the database system, memory is allocated from an operating system (OS) before the data is actually stored to memory. In many instances, only part of the memory that has been allocated is actually used to store the data. In addition, the memory is managed using a memory management scheme that can include multiple levels, each level having respective restrictions due to internal memory management policies and/or mechanisms.

Figure 2:
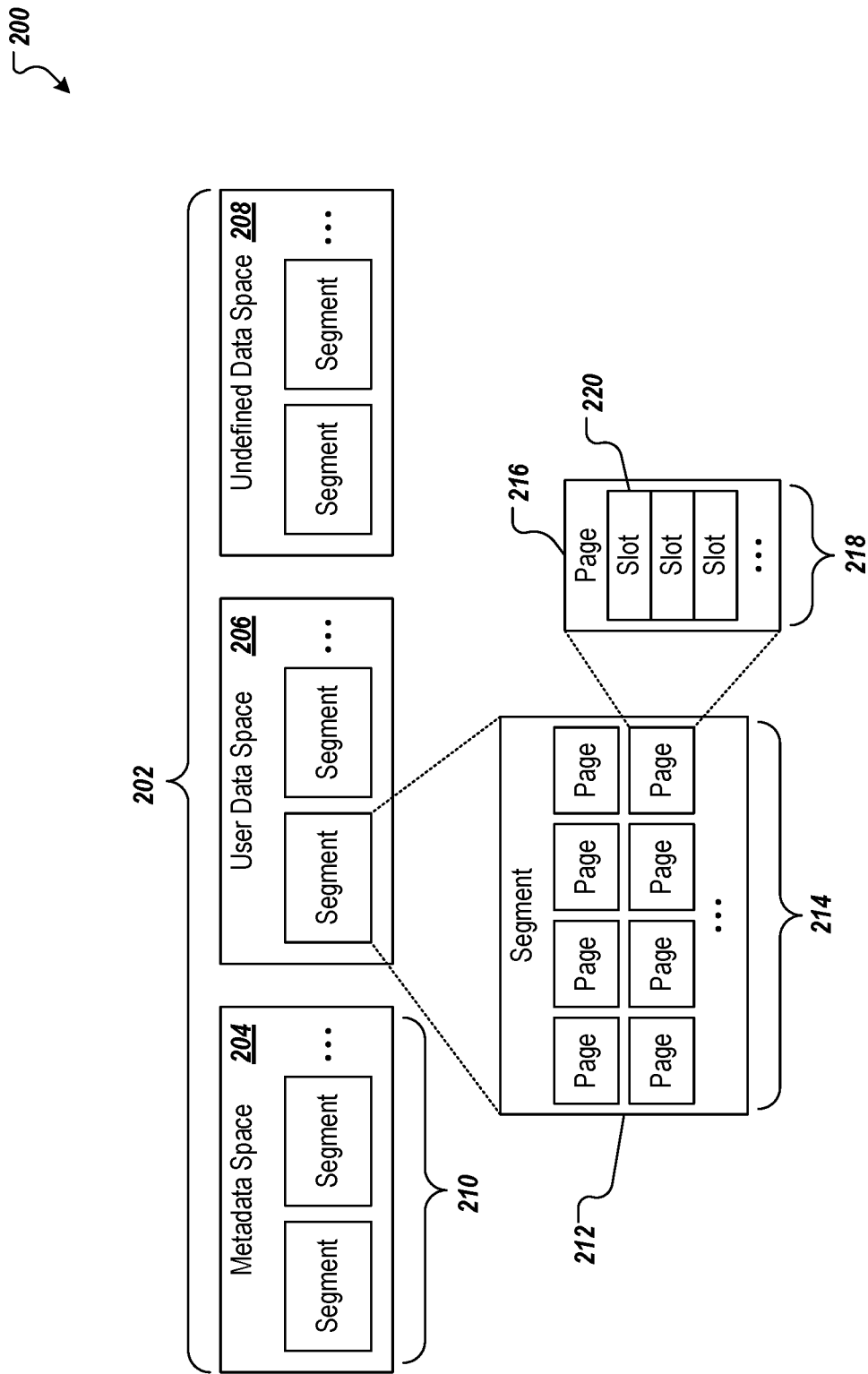
FIG. 2 depicts a graphical representation of an example memory management scheme of an example database system.

FIG. 2 depicts a graphical representation of an example memory management scheme 200 of an example database system. More particularly, the example memory management scheme 200 is used for row store in the SAP HANA database system, introduced above. In the example memory management scheme 200, memory is managed in a set of levels that are hierarchically arranged from largest size to smallest size.

As depicted in FIG. 2, the example memory management scheme 200 includes a data space 202 that includes a metadata space 204, a user data space 206, and an undefined data space 208. Each data space 204, 206, 208 includes a set of segments 210 (e.g., metadata segments, user data segments, and undefined data segments, respectively). Each set of segments 210 includes one or more segments 212, each segment 212 includes a set of pages 214. Each set of pages 214 includes one or more pages 216. Each page 216 includes a set of slots 218. Each set of slots includes one or more slots 220, each slot 220 storing data. The slots 220 are the basic unit for operation of the database system.

Memory is allocated/deallocated by the OS by segment, which is a large continuous memory space. Using row store as a continued example, row store manages memory by page, which is part of the allocated segment. Deallocation only occurs when all pages of the to-be-deallocated segment are unused (i.e., there is no used page in the segment). In other words, a segment cannot be freed, if it has any used pages, a used page being a page having at least one used slot (i.e., a slot storing data that is still in use).

With regard to allocating memory, one or more processes for allocating memory can be used. An example process for allocating memory in row store is described in further detail herein. When a slot is requested for storing data, the memory manager tries to find a page to use from the already allocated pages. In some examples, the memory manager uses a slot requirement to determine whether a particular page from allocated pages is available. The slot requirement can be provided as the requested slot size (i.e., the amount of memory required to store the data). Further, the space (data space) is matched to slot usage, metadata or user data (tables), and the type of data (described in further detail herein) should be matched. For example, fixed length data and variable length of data should use different page. The data of different tables should be stored in different pages, and the size of slots should be matched to the requested slot size.

In some examples, the memory manager determines whether a sparse page or a cached page is available in an allocated segment. A sparse page generally refers to a page that has a slot utilization that is less than a threshold slot utilization (e.g., a page that has at least one empty slot and at least one used slot). In some examples, slot utilization is calculated as a percentage of used slots (relative to total number of slots in the page). A cached page refers to a page within an allocated segment that is available. If there are no pages within the allocated segments to meet the slot requirement, the memory manager tries to get a new page from the allocated segments. In some examples, the memory manager determines whether any sparse segment is available to meet the storage need. A sparse segment generally refers to a segment that has a page utilization that is less than a threshold page utilization (e.g., a segment that has at least one empty page and at least one used page). In some examples, page utilization is calculated as a percentage of used pages (relative to total number of pages that can be included in the segment page). If there is no sparse segment to allocate a page, the memory manager allocates a segment (new segment) and allocates a page (new page) from the (new) segment.

In some examples, a set of data types is provided and includes types that content of the data is assigned to. Example types include type A, type B, type C, and type Q. In some examples, data that has a fixed length (fixed size) is type A data, data that has a variable length (variable size) and include metadata identifying an owner of the data (e.g., the record that the data belongs to) is type B data, and data that has a variable length (variable size), but is absent metadata identifying an owner of the data is type C data. In some examples, a record of a table includes one or multiple slots including a slot for fixed length data and one or more slots for variable length data (or no variable part slot is also possible). In some implementations, by defining data types, the online defragmentation process moves the data by deleting record and inserting the same record to another place and requires identification, of which record should be moved to remove a target slot. The record can be relatively easily identified with fixed length data slots. However, for variable length data slots, an indirect way for type B data and full table scan for type C data is used in order to find the target record.

In some examples, type Q data is miscellaneous data that is not used in transactions. Type Q data can be described as quarantined memory, which is not expected, but exists because of a bug or other exceptional situation (e.g., leaked memory).

In some examples, a type order is provided as type A, type B, then type C (e.g., type A>type B>type C). In some examples, a type of a page is determined based on the type of the data stored therein, and a type of a segment is determined based on the types of the pages therein. For example, if a segment has any type C page, then the segment type is determined to be type C. If a segment has no type C pages and has one or more type B pages, then the segment type is determined to be type B. If a segment has only type A pages, then segment type is determined to be type A.

In terms of defragmentation, memory storing type Q data is not defragmented. In some examples, segments of type A have better defragmentation performance than segments of type B, and segments of type B have better defragmentation performance than segments of type C. In general, defragmentation performance can be defined in terms of amount of memory that is defragmented, a time required to defragment, and/or technical resources (e.g., CPU) required to execute the defragmentation.

Figure 3:
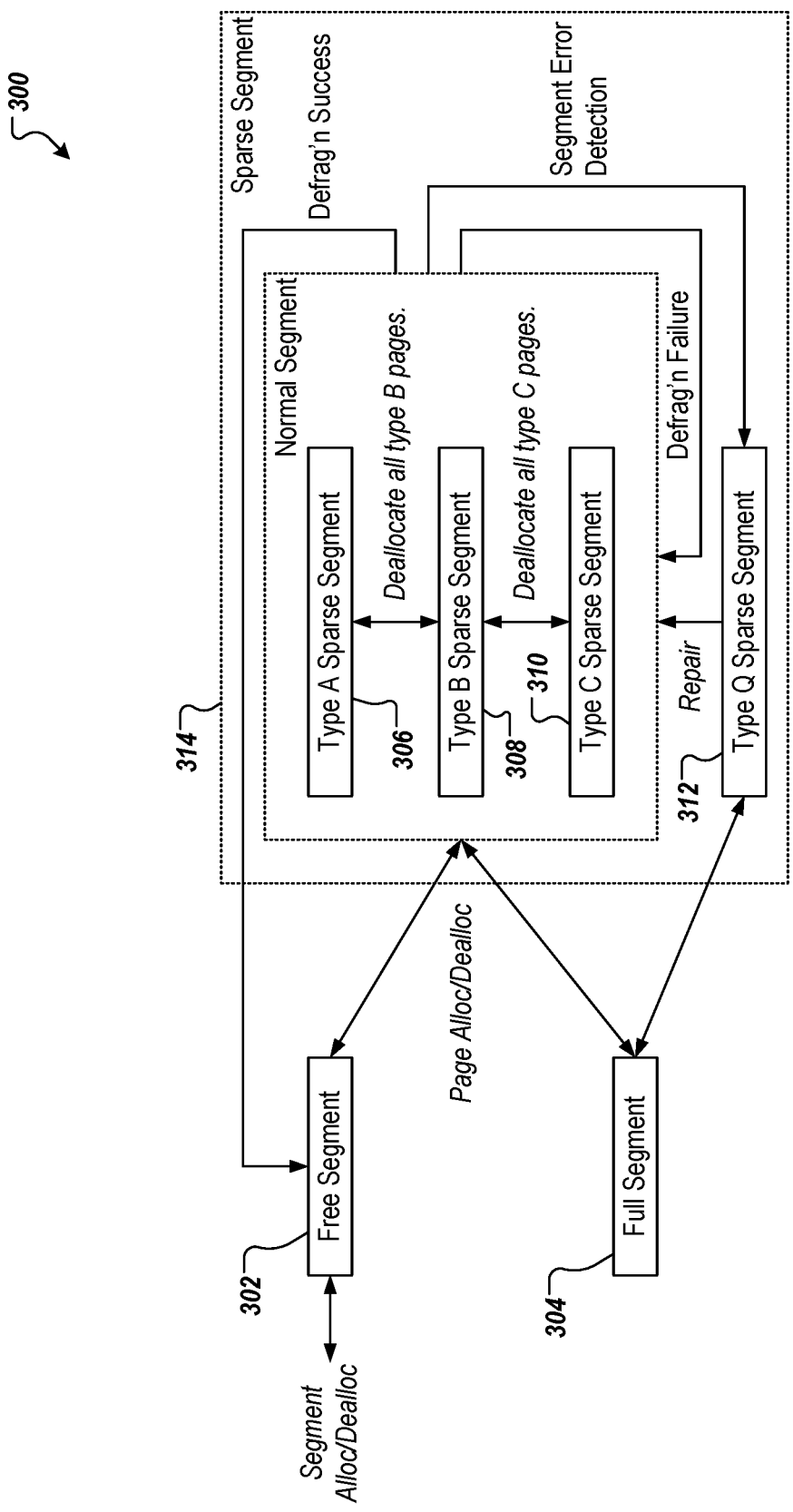
FIG. 3 depicts a graphical representation of an example segment type transition for the example memory management scheme of FIG. 2.

FIG. 3 depicts a graphical representation of an example segment type transition 300 for the example memory management scheme of FIG. 2. The example segment type transition 300 depicts how a type of a segment can change.

As depicted in FIG. 3, a free segment 302 that is transited from a new memory allocation or all data of all pages in the segment is deleted, which can occur as a result of data manipulation or a defragmentation process. Once a page of the free segment 302 is used by database system, the free segment transitions to being classified as a sparse segment 314 and a segment type is determined as the type of data (e.g., A, B, C). Accordingly, the segment is one of a type A sparse segment 306, a type B sparse segment 308, and a type C sparse segment. After the segment 302 is classified as a sparse segment 314, the segment type can be changed among 306, 308, 310 as data insertion and/or deletion transactions occur. If data insertion causes all pages in the segment to become full, then the segment transitions to be a full segment 304. If defragmentation success to make a segment of sparse segment 314 empty, the segment transitions to be a free segment 302 and possibly to be deallocated. If defragmentation fails to empty the sparse segment, then the segment remains in a sparse segment 314 with proper type. If the unexpected page is detected during defragmentation, the segment containing the page is moved to type Q sparse segment 312.

In data storage, memory fragmentation (also referred to herein as fragmentation) is a common problem. Fragmentation refers to a situation where the memory in use is less than the allocated memory. Fragmentation can be caused by instances, in which the required memory cannot be provided even though there is enough total free memory (e.g., there is insufficient continuous memory to store particular data that is to be stored). Fragmentation in database storage results in wasted memory and degrades overall data access performance. For example, fragmentation results in an increased amount of memory to be accessed to retrieve required data than a well-utilized database system (e.g., a database system with no fragmentation or less fragmentation).

Using row store as a non-limiting example, fragmentation usually occurs because the deallocation of one or more segments is not possible even though there is larger free memory than a segment size (e.g., there are many sparse segments, each only having a few used pages). This memory status (fragmented) is caused by the random deletion of used memory. To be specific, although the allocated memory is used continuously at the beginning, the deletion happens at any point of the used memory, and results in sparse segments over time.

Defragmentation refers to a process to reduce fragmentation. In general, fragmentation is performed by moving (deleting and inserting) data from sparse pages to dense pages. Using row store as a non-limiting example, defragmentation is performed by moving used pages from the segments with a lower number of used pages to other segments. In this manner, segments can be emptied and deallocated. An example defragmentation can include calculating a number of segments that can be freed (e.g., segments, for which all used pages can be moved to other segments), select a set of segments to be freed (a set of target segments), move used memory of target segments to the remaining segments, and deallocate each target segment, if the target segment is empty after moving the used memory.

From the example process for defragmentation provided above, there are several factors that affect defragmentation performance. One factor that affects the defragmentation performance, is the cost (i.e., technical cost in terms of resources expended to perform) to identify the segments that are to be included in the set of target segments. Another factor is the size of the data that is to be moved during defragmentation. Further, if defragmentation fails, the process is retried, which results in the above-described costs being expended again to reduce fragmentation.

Another factor, which is directly related to segment type categorization (A, B, C, Q), is the cost to identify affected database tables. Affected database tables in segments of type A and type B can be identified instantly. However, a full database scan at the record level is required to identify affected tables in segments of type C. Affected tables need to be identified, because metadata of affected tables needs to be read to move their records.

Different types of defragmentation can be provided. Example types include offline defragmentation and online defragmentation. Offline defragmentation refers to a defragmentation process that is executed while the database system is offline. That is, the database system is taken out of production use (i.e., the database system is not in service and no transactions can be performed). Online defragmentation refers to a defragmentation process that is executed while the database system is online. That is, the database system continues to operate in production use (i.e., active users and workloads). Offline defragmentation runs in isolation, and there is no need to consider complex table locking, record locking or other multi-version concurrency control (MVCC). Consequently, offline defragmentation is more effective in defragmenting memory than online defragmentation. However, by its nature, offline defragmentation requires service down-time, which is not always acceptable (e.g., some database systems require availability 24/7).

In contrast, and as noted above, online defragmentation is performed while the database system is running. Consequently, online defragmentation is more complex as than offline defragmentation, because locking and MVCC need to be considered. To account for this, online defragmentation typically locks tables using exclusive lock (X-lock). X-lock guarantees a table or a record, which is being or going to be moved by the online defragmentation process, is not manipulated by another transaction while the lock is acquired. That is, the X-lock blocks any data manipulation language (DML) transactions (e.g., DML statements DELETE, INSERT and UPDATE) from being executed. X-lock also guarantees that all records of the table are visible to the lock acquirer (otherwise, table lock could not be acquired). However, in a wide sense, using X-lock is not a real online operation, because all updates are blocked for the table while executing defragmentation. That is, using X-lock, respective tables are effectively brought offline during the defragmentation process.

In view of the above context, implementations of the present disclosure provide online defragmentation of memory in database systems. More particularly, and as described in further detail herein, implementations of the present disclosure identify sparse pages within the database system, apply an intent-exclusive (IX) lock on the affected table and an exclusive (X) lock on respective records stored in sparse pages, and execute an iterative defragmentation process to move data records in slots of sparse pages to non-sparse pages (e.g., dense pages). In accordance with implementations of the present disclosure, when data manipulation occurs, two different types of locks are applied. A first lock is a table lock, provided as an IX-lock, and a second lock is a record lock, provided as a X-lock, which is applied on each record being manipulated. An IX-lock is only applicable to table lock and multiple IX-locks can co-exist. The X-lock should be applied on a record being manipulated, so that the record is prevented from being manipulated by multiple transactions at the same time. In some examples, the IX-lock is applied to a table to prevent concurrent DDL execution, which changes table definition or even drops the table.

Implementations of the online defragmentation of the present disclosure are described in further detail herein with reference to FIGS. 4A-4E, which depict a graphical representation of an example online defragmentation 400 in accordance with implementations of the present disclosure. The example online defragmentation 400 is described with reference to a commit timestamp (CTS) and an iteration timestamp (ITS), also referred to as a snapshot timestamp. In some examples, the CTS indicates when a respective transaction is committed within the database system. In some examples, the iteration timestamp indicates a timestamp that an iteration of defragmentation is operating on. For example, the defragmenter can be considered a reader, which reads data from the pages, and the iteration timestamp indicates which version of data records are visible to the defragmenter. For example, the defragmenter is able to read data records (or respective versions) having a CTS equal to or less than the iteration timestamp.

At the outset of the online defragmentation of the present disclosure, a defragmenter (e.g., one or more computer-executable programs executed within the database system to defragment memory in accordance with implementations of the present disclosure) identifies sparse pages and marks one or more sparse pages. Sparse pages that are marked, are pages that are to be removed by the defragmenter, as described in further detail herein. In some implementations, if a sparse page is marked, a slot is no longer able to be allocated in the page. In some examples, an IX-lock is applied by the memory manager to a table having records affected by the defragmentation process. In this manner, marked pages are excluded when the memory manager allocates slots. However, other operations, such as update can be performed. This enables the defragmentation process of the present disclosure to minimize the number of defragmentation iterations required for moving all records from sparse pages to non-sparse pages.

In some implementations, a page is identified as a sparse page based on utilization. In some examples, utilization is calculated as a ratio of used slots to total number of slots in a page. In some examples, if the utilization is less than a threshold utilization (e.g., 0.50), the page is determined to be a sparse page. In some examples, at the outset of the online defragmentation, the defragmenter identifies a set of sparse pages, which includes all pages having utilization less than the threshold utilization.

In some implementations, one or more sparse pages in the set of sparse pages are marked for defragmentation. In some examples, sparse pages whose number of records is small enough that all records in the sparse pages can be moved to non-sparse pages without allocating a new page are marked. In this manner, a set of marked pages is provided. In some examples, the set of marked pages includes all sparse pages in the set of sparse pages. In some examples, the set of marked pages includes less than all sparse pages in the set of marked pages.

Figure 4A:
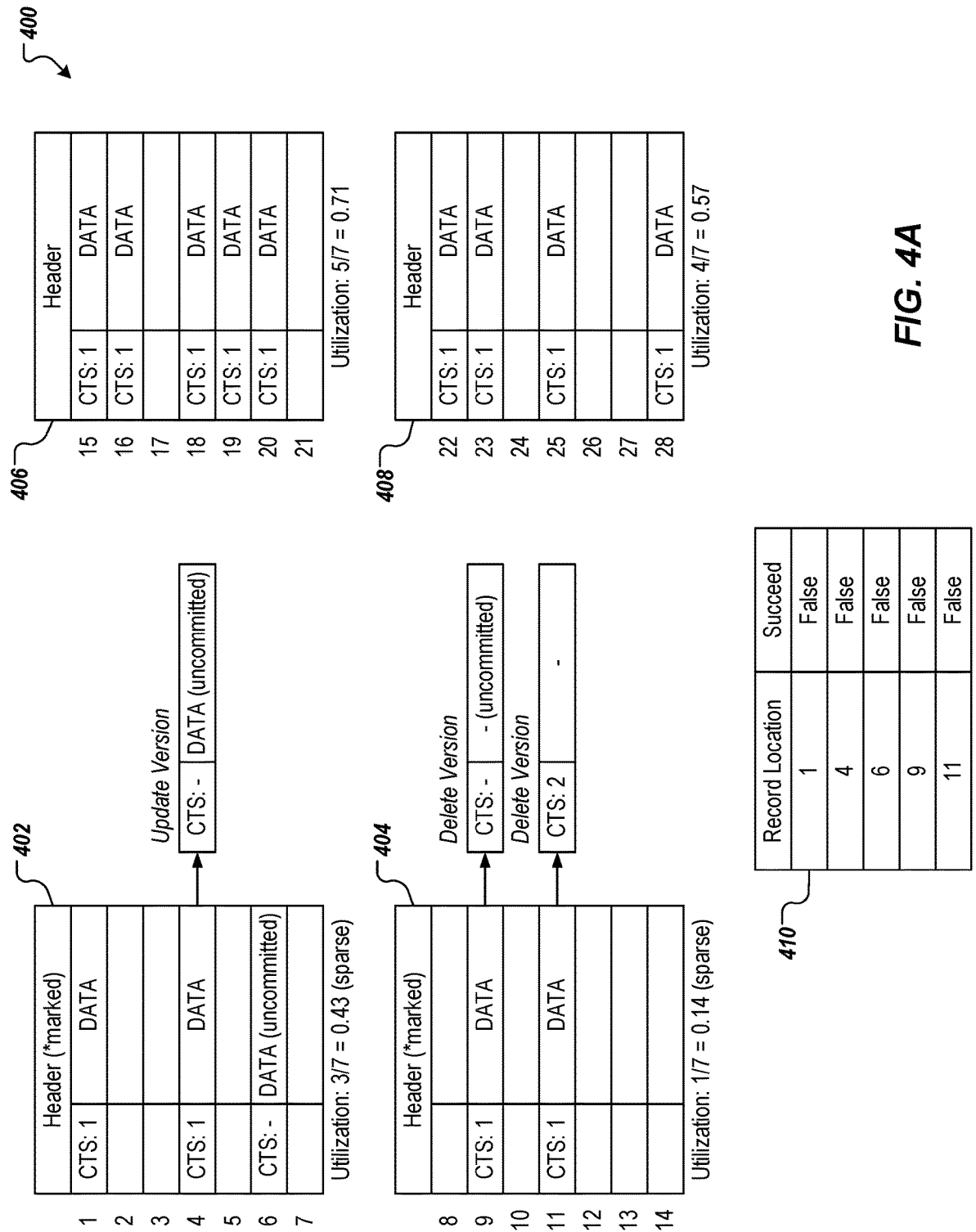
FIGS. 4A-4E depict a graphical representation of an example online defragmentation in accordance with implementations of the present disclosure.

FIG. 4A depicts example pages 402, 404, 406, 408 at an initial point (e.g., before a first iteration of online defragmentation begins). Each page 402, 404, 406, 408 includes a set of slots, in which data records can be stored. In some examples, each slot has a record location associated therewith. For example, the page 402 includes record locations 1-7 (i.e., seven slots), the page 402 includes record locations 8-14 (i.e., seven slots), the page 404 includes record locations 15-21 (i.e., seven slots), and the page 404 includes record locations 22-28 (i.e., seven slots).

In some examples, prior to starting defragmentation, and as described herein, utilization is calculated. In the example of FIG. 4A, the page 402 has a utilization of 0.43, the page 404 has a utilization of 0.14, the page 406 has a utilization of 0.71, and the page 408 has a utilization of 0.57. In this example, the page 402 and the page 404 are identified as sparse pages (e.g., utilizations are less than a threshold utilization) and are included in a set of sparse pages (e.g., a utilization less than 0.50).

In some examples, it can be determined that the number of data records of the page 402 and the number of the data records of the page 404 can collectively fit into slots of non-sparse pages, collectively (e.g., the page 404 and the page 406). For example, it can be determined that the page 402 and the page 404 collectively have four data records to be moved, and the page 406 and the page 408 collectively have four available slots to receive data records. Consequently, the page 402 and the page 404 are included in a set of marked pages and are marked for defragmentation. In some examples, the segment that the page is in is marked (e.g., a flag associated with the segment is set to 1). In this manner, all pages in the marked segment are marked. For example, and in the example of FIG. 4A, the segment (Segment 1) that the page 402 is in is marked (hence, the page 402 is also marked) and the segment (Segment 2) that the page 404 is in is marked (hence, the page 404 is marked).

In the example of FIGS. 4A-4E, the size of each data record is the same and each only occupies a single slot in a page. It is contemplated, however, that a data record can occupy multiple slots in a page (e.g., a data record having variable-length data such as VARCHAR).

In accordance with implementations of the present disclosure, a record map 410 is provided for the sparse pages 402, 404. In some examples, the record map 410 is provided as a list of KEY-VALUE pairs, in which each KEY is the record location (also referred to as record ID, which uniquely identifies the record) of a data record that is to be moved and the VALUE is a Boolean representing whether movement of the data record has been completed (e.g., successful (=TRUE), not successful (=FALSE)). Initially, the values are all set to FALSE.

In the example of FIG. 4A, the data stored in record location 4 of the page 402 has an update version that has not yet been committed, the data stored in the record location 6 of the page 402 has been inserted, but not yet committed, the data stored in record location 9 of the page 404 has a delete version that has not yet been committed, and the data that had been stored in the record location 11 of the page 404 has a delete version that has already been committed. That is, in the depicted example, a transaction was performed to update the data stored in record location 4 of the page 402, a transaction was performed to insert the data stored in record location 6, and a transaction was performed to delete the data stored in record location 9 of the page 404, neither having been yet committed at the start of defragmentation. Accordingly, record locations 4, 6, and 9 are locked by the respective transactions.

As described herein, at the onset of each iteration of defragmentation, an IX-lock is applied to each table that owns at least one page in the sparse pages. In the example of FIG. 4A, one or more tables that have data stored in the page 402 and/or the page 404 would each have an IX-lock applied thereto. As described in further detail herein, during defragmentation, a try-lock is applied to each record that is to be moved (i.e., records in the sparse pages 402, 404 that are to be moved) immediately before trying to move the record. In some examples, the try-lock can be described as an X-lock with the exception that the try-lock immediately returns 'false' instead of waiting to lock the record, if the record is already locked by another transaction. In this manner, a deadlock situation is avoided.

Figure 4B:
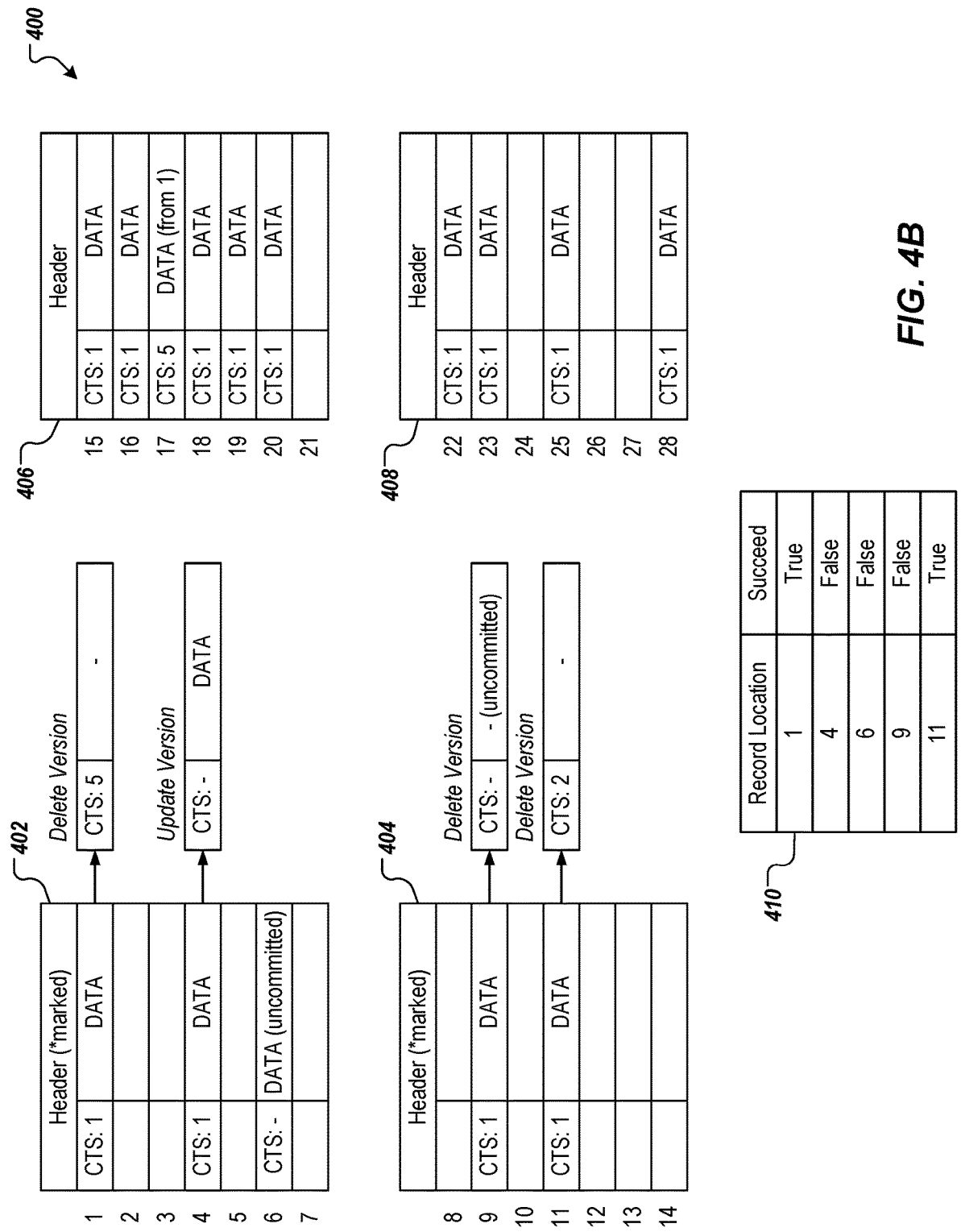

In defragmentation, the defragmenter executes transactions to delete data from sparse pages and add the data to non-sparse pages. FIG. 4B depicts an iteration of defragmentation and includes, for example, an iteration timestamp of 2 and CTS of 5. That is, the defragmenter can read transactions (and respective versions, if any) having a CTS less than or equal to 2. In the example of FIG. 4B, the defragmenter attempts to acquire a try-lock (also referred to herein as record lock) on the record locations 1, 4, 6, and 9. In some examples, the try-lock locks a respective record location from having transactions executed thereon by other processes (i.e., processes other than the defragmenter). In this example, the defragmenter succeeds in acquiring the record lock for the record location 1, but is unsuccessful in acquiring record locks for the record locations 4, 6, and 9, because each is locked by other transactions waiting for commitment. That is, because none of the record locations 4, 6, and 9 have been committed, the defragmenter is unable to read the data records. The defragmenter executes a transaction to delete the data record in the record location 1, resulting in a delete version that is committed at CTS 5, and adds the data from the record location 1 to the record location 17 (in the page 406) which is also committed at CTS 5. Further, the defragmenter updates the table 410 to set the value for record location 1 to TRUE. Also, because the delete version for the record location 11 has been previously committed, the table 410 is updated to set the value for record location 11 to TRUE.

Figure 4C:
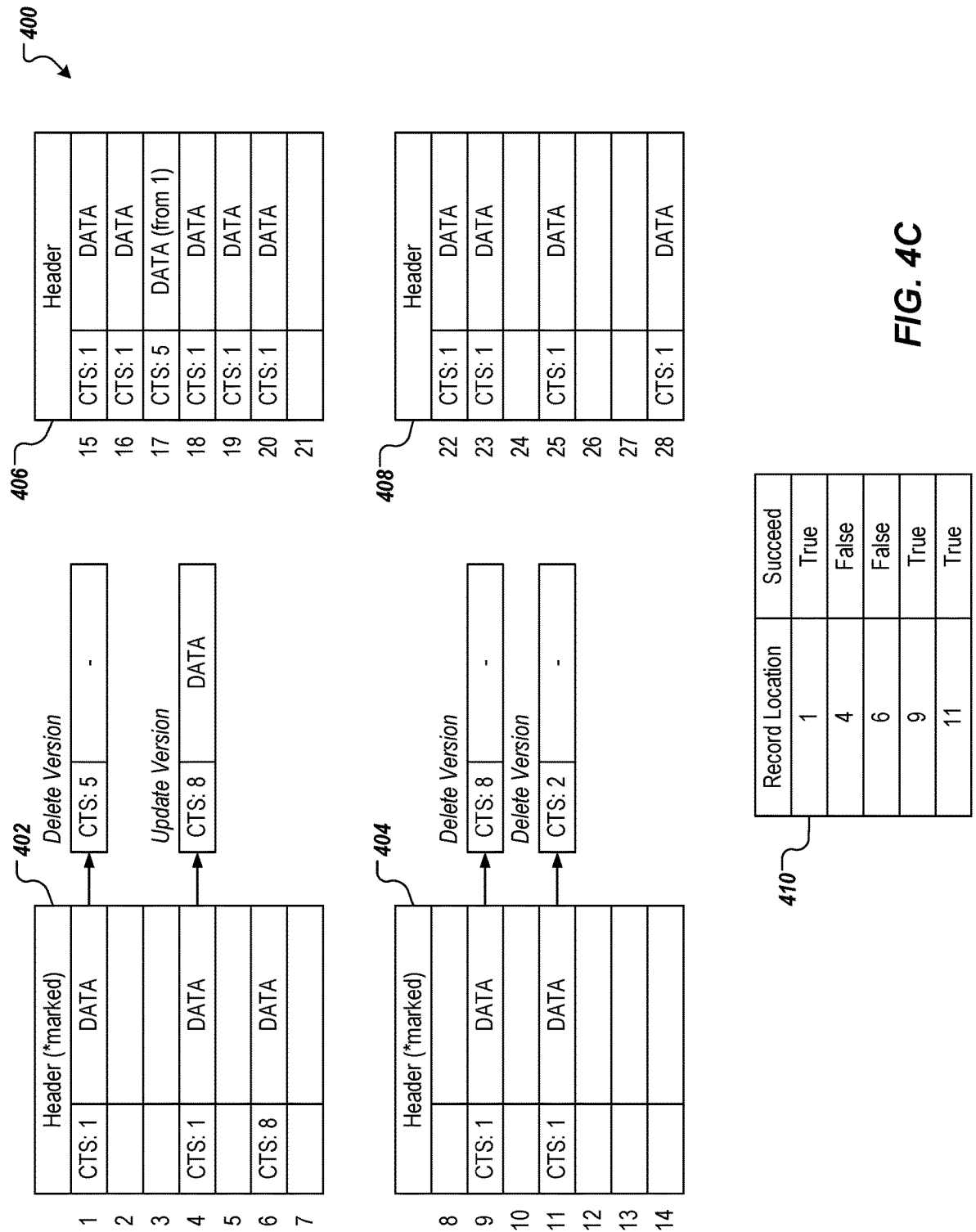

FIG. 4C depicts an iteration of defragmentation and includes, for example, an iteration timestamp of 7 and CTS of 8. That is, the defragmenter can read transactions performed on records (and respective versions, if any) having a CTS less than or equal to 7. In the example of FIG. 4C, the defragmenter applies a try-lock on the record in the record location 4. However, a serialization failure occurs, because its latest commit timestamp (8) is higher than the iteration timestamp (7). Consequently, the defragmented fails to move the record from record location 4. The defragmenter applies a try-lock on the record in the record location 6. However, a serialization failure occurs, because its latest commit timestamp (8) is higher than the iteration timestamp (7). The defragmented fails to move the record from the record location 6. The defragmenter applies a try-lock on the record in the record location 9. However, a serialization failure occurs, because its latest commit timestamp (8) is higher than the iteration timestamp (7). However, because the latest version is a delete version, there is no need to move the record any longer. In the example of FIG. 4C, the defragmenter moves no records, so no transaction is committed.

However, because the data of record location 9 has a delete version, the defragmenter need not perform any transactions to move data associated with record location 9. Instead, because the data of record location 9 has a delete version, the defragmenter can update the record map 410 to provide a value of TRUE for the record locations 9.

Figure 4D:
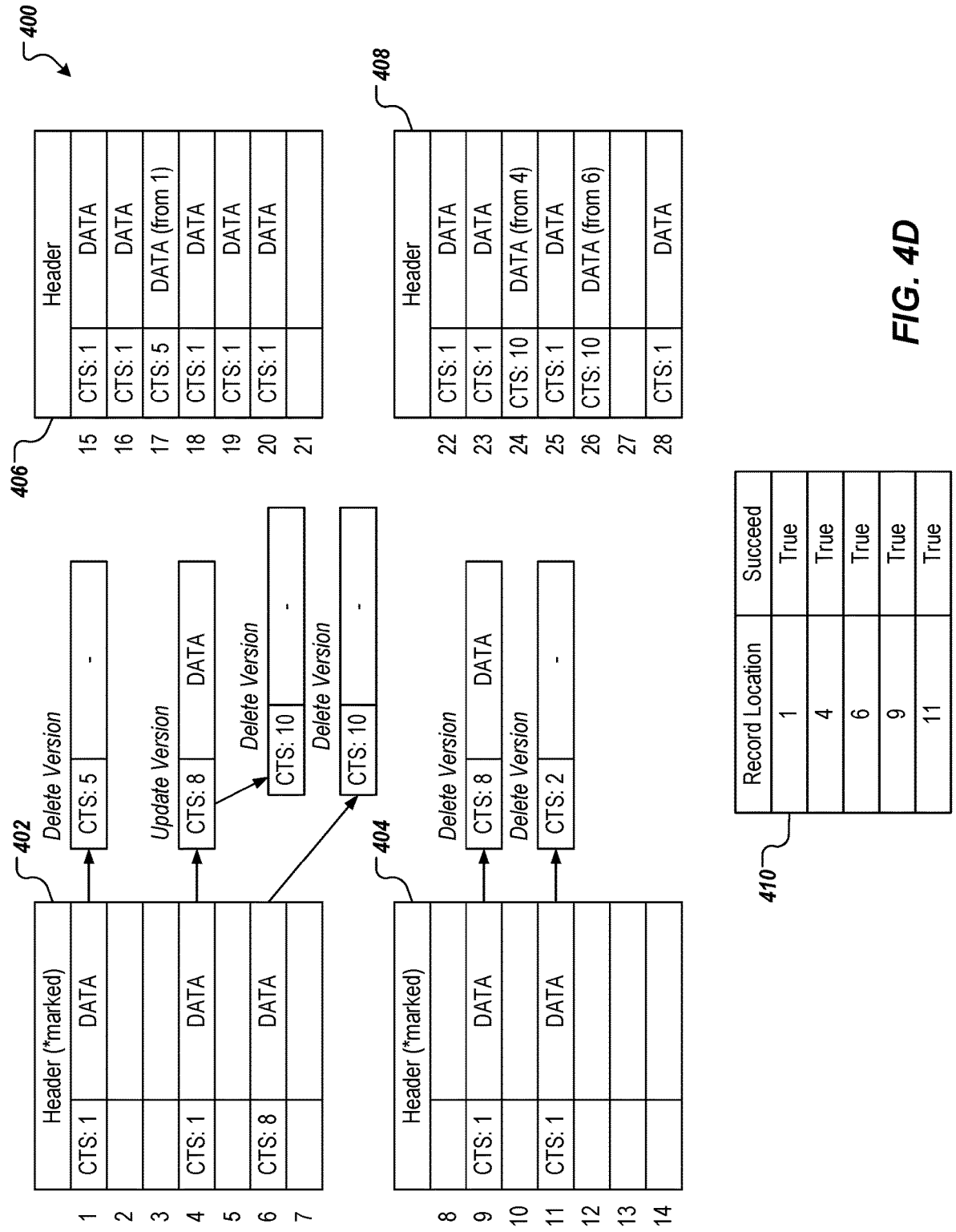

FIG. 4D depicts an iteration of defragmentation and includes, for example, an iteration timestamp of 9 and CTS of 10. That is, the defragmenter can read transactions (and respective versions, if any) having a CTS less than or equal to 9. Consequently, the defragmenter is able to read the update version of the data of record location 4, and the data of record location 6. The defragmenter acquires a try-lock for each of the record locations 4, 6, and 9. In accordance with implementations of the present disclosure, the defragmenter executes transactions to delete data associated with record location 4 (e.g., the data and the update version) and to store the data (update version) of record location 4 in record location 24 of the page 408, and executes transactions to delete data associated with record location 6 and to store the data of record location 6 in record location 26 of the page 408. Each of the transactions is committed at CTS=10. Accordingly, the defragmenter can update the record map 410 to provide values of TRUE for each of record locations 4 and 6.

Figure 4E:
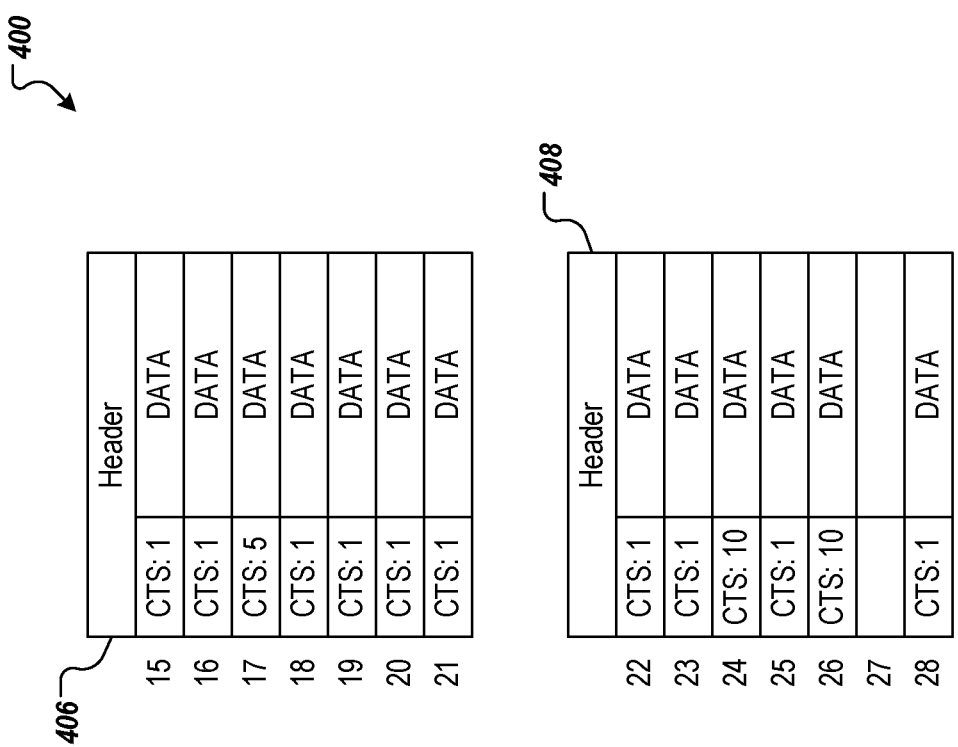

Accordingly, at CTS=10, all of the data associated with the record locations 1, 4, 6, and 9 of the sparse pages 402, 404 have been deleted. Consequently, the sparse pages 402, 404 no longer have any data that is used, and can be deallocated (e.g., in a subsequent garbage collection). This results in only the pages 406, 408 remaining as depicted in FIG. 4E and include utilizations of 1 and 0.86, respectively.

In accordance with implementations of the present disclosure, before executing an iteration of defragmentation, the defragmenter determines whether any record locations in the record map 410 is assigned a value of FALSE. If at least one record location has a value of FALSE, an iteration of defragmentation is performed, as described herein. If all record locations have a value of TRUE (e.g., as depicted in FIG. 4D), defragmentation is complete.

Figure 5:
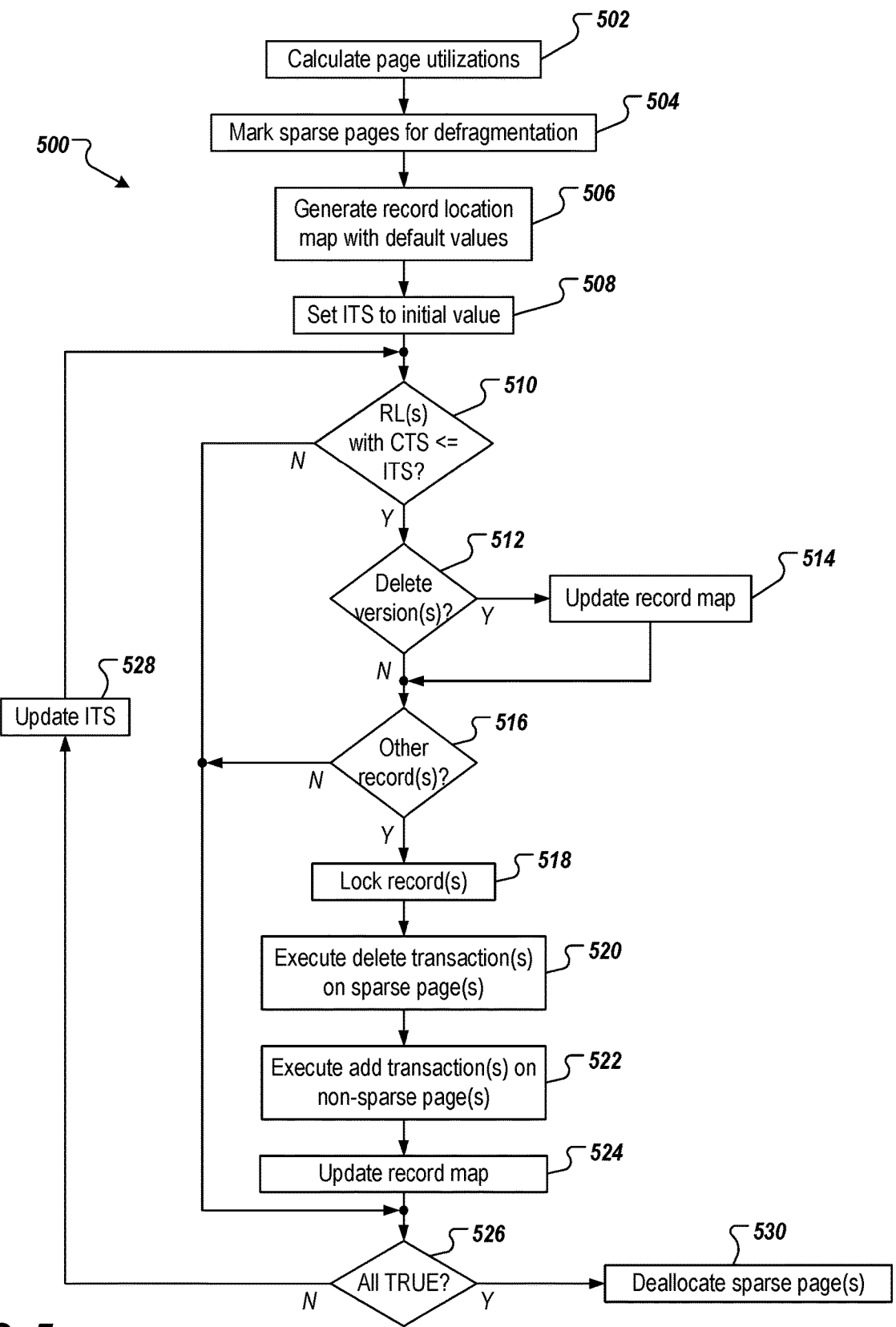
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Utilizations are calculated for pages (502). For example, and as described herein, utilization is calculated as a ratio of used slots to total number of slots in a page. In some examples, if the utilization is less than a threshold utilization (e.g., 0.50), the page is determined to be a sparse page. One or more sparse pages are marked for defragmentation (504). For example, and as described herein, at the outset of the online defragmentation, the defragmenter identifies a set of sparse pages, which includes all pages having utilization less than the threshold utilization. In some implementations, one or more sparse pages in the set of sparse pages are marked for defragmentation. In some examples, sparse pages whose number of records is small enough that all records in the sparse pages can be moved to non-sparse pages without allocating a new page are marked. For example, a number of available slots in non-sparse pages is determined and sparse pages having a total number of used slots that is equal to or less than the number of available slots are marked for defragmentation. In this manner, a set of marked pages is provided. In some examples, the set of marked pages includes all sparse pages in the set of sparse pages. In some examples, the set of marked pages includes less than all sparse pages in the set of marked pages.

A record map is generated with default values (506). For example, and as described herein, the record map is provided as a list of KEY-VALUE pairs, in which each KEY is the record location of a data record that is to be moved and the VALUE is a Boolean representing whether movement of the data record has been completed (e.g., successful (=TRUE), not successful (=FALSE)). Initially, the values are all set to FALSE. An initial value is provided for an iteration timestamp (ITS) (508). In some examples, the initial value for the iteration timestamp is less than the value for the CTS. In some examples, the initial value for the iteration timestamp is 1 (e.g., ITS=1). In some examples, a global timestamp manager (GTM) is provided (e.g., the database system includes the GTM) and issues both ITS and CTS using the timestamp value at the point of time a transaction starts and is committed. In some examples, a timestamp value monotonically increases whenever a transaction is committed. When a transaction is committed, the GTM increases the timestamp value first and then issues a CTS. In this manner, the CTS is always higher than ITS within the same transaction At the outset of each iteration, an IX-lock is applied to any table associated with a marked (sparse) page. It is determined whether any record locations (RLs) in the sparse page(s) have a CTS that is less than or equal to the ITS (510). For example, and as described herein with reference to FIG. 4B, the defragmenter is able to read data in record location 1, because the CTS of record location 1 is less than the ITS. If there are one or more record locations in the sparse page(s) have a CTS that is less than or equal to the ITS, it is determined whether any of the record locations are associated with delete versions (512). For example, and as described above with reference to FIG. 4B, the record location 11 is associated with a delete version (i.e., a transaction had deleted the data originally stored in the slot at record location 11. If one or more record locations are associated with a delete version, the record map is updated (514). For example, and as described above with reference to FIG. 4D, the record map is updated to set the VALUE to TRUE for any record locations are associated with a delete version.

If there are no record locations associated with a delete version, it is determined whether any other record locations remain (516). That is, it is determined whether there are any record locations that are not associated with a delete version, but have a CTS that is less than or equal to the ITS. If there is at least one other record location remaining, respective record locks are acquired (518). For example, and as described herein, the defragmenter acquires a try-lock for each of the data records (slots).

One or more delete transactions are executed on the sparse page(s) (520) and one or more add transactions are executed on the non-sparse page(s) (522). For example, multiple transactions can be executed to perform a single iteration of defragmentation. However, 'delete' and 'add' of a particular record should be performed with the same transaction to guarantee atomicity, consistency, isolation, and durability (ACID) properties, especially atomicity. As described herein with reference to FIG. 4B, the defragmenter executes a transaction to delete the data record in the record location 1 from the sparse page 402, resulting in a delete version that is committed at CTS 5, and adds the data from the record location 1 to the record location 17 (in the non-sparse page 406), which is also committed at CTS 5. The record map is updated (524). As described herein, for any record locations having data moved from a sparse page to a non-sparse page, the respective VALUE is set equal to TRUE. For example, and as described above with reference to FIG. 4B, the defragmenter updates the table 410 to set the value for record location 1 to TRUE.

It is determined whether all record locations have a value of TRUE within the record map (526). If all record locations have a value of TRUE, defragmentation is complete and the sparse page(s) can be deallocated. In this manner, in a subsequent execution of a garbage collection process, the sparse page(s) can be deleted. If at least one record location in the record map has a value of FALSE, another iteration of defragmentation is to be performed. The value of ITS is updated (528) and the example process 500 loops back. For example, ITS is incremented (e.g., by 1).

Figure 6:
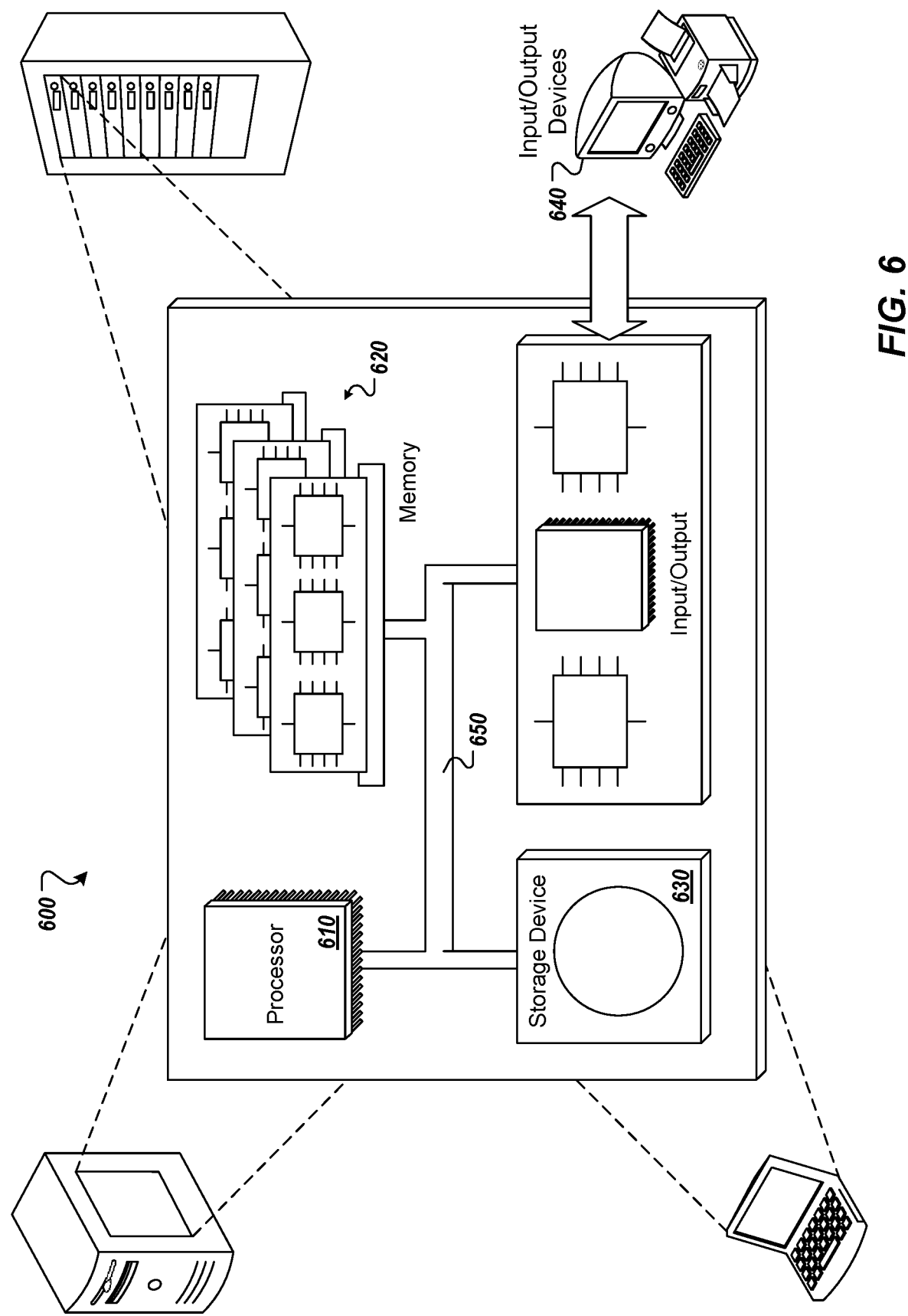
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for online defragmentation of memory in database systems, the method being executed by one or more processors and comprising:
   defining a set of marked pages comprising one or more sparse pages having respective data records that are to be deleted during online defragmentation;
   applying an intent exclusive lock (IX-lock) to each of one or more tables having data stored in a marked page in the set of marked pages, the IX-lock enabling a first set of transactions to be executed on data stored in each marked page and prohibiting a second set of transactions to be executed on data stored in each marked page;
   generating a record map comprising key-value pairs, each key-value pair being associated with a respective record location in one of the marked pages, a value of each key-value pair being initially set to a first value;
   iteratively executing the online defragmentation to delete data from one or more marked pages and add the data to one or more non-sparse pages, at least one iteration comprising applying a try-lock to a record in a marked page;
   at one or more iterations of the online defragmentation, updating the record map to change the value of at least one key-value pair from the first value to the second value, the second value representing that data from a record location of a marked page has been deleted from the marked page and added to a non-sparse page; and
   ceasing execution of the online defragmentation in response to determining that all of the key-value pairs in the record map are equal to the second value.

2. The method of claim 1, wherein defining a set of marked pages comprises:
   calculating a utilization for each page of a set of used pages, each used page comprising at least one slot that is used for data storage; and
   defining a set of sparse pages based on respective utilizations, at least one sparse page in the set of sparse pages being included in the set of marked pages.

3. The method of claim 1, wherein the first set of transactions comprises deleting data from a marked page.

4. The method of claim 1, wherein the second set of transactions comprises allocating at least one slot in a marked page and storing data in the at least one slot.

5. The method of claim 1, wherein after online defragmentation, each of the marked pages is deallocated.

6. The method of claim 1, wherein the database system is in production use during execution of the online defragmentation.

7. A non-transitory computer-readable storage medium coupled to one or more processors and having instructions stored thereon which, when executed by the one or more processors, cause the one or more processors to perform operations for online defragmentation of memory in database systems, the operations comprising:

defining a set of marked pages comprising one or more sparse pages having respective data records that are to be deleted during online defragmentation;

applying an intent exclusive lock (IX-lock) to each of one or more tables having data stored in a marked page in the set of marked pages, the IX-lock enabling a first set of transactions to be executed on data stored in each marked page and prohibiting a second set of transactions to be executed on data stored in each marked page;

generating a record map comprising key-value pairs, each key-value pair being associated with a respective record location in one of the marked pages, a value of each key-value pair being initially set to a first value;

iteratively executing the online defragmentation to delete data from one or more marked pages and add the data to one or more non-sparse pages, at least one iteration comprising applying a try-lock to a record in a marked page;

at one or more iterations of the online defragmentation, updating the record map to change the value of at least one key-value pair from the first value to the second value, the second value representing that data from a record location of a marked page has been deleted from the marked page and added to a non-sparse page; and ceasing execution of the online defragmentation in response to determining that all of the key-value pairs in the record map are equal to the second value.

8. The computer-readable storage medium of claim 7, wherein defining a set of marked pages comprises:

calculating a utilization for each page of a set of used pages, each used page comprising at least one slot that is used for data storage; and defining a set of sparse pages based on respective utilizations, at least one sparse page in the set of sparse pages being included in the set of marked pages.

9. The computer-readable storage medium of claim 7, wherein the first set of transactions comprises deleting data from a marked page.

10. The computer-readable storage medium of claim 7, wherein the second set of transactions comprises allocating at least one slot in a marked page and storing data in the at least one slot.

11. The computer-readable storage medium of claim 7, wherein after online defragmentation, each of the marked pages is deallocated.

12. The computer-readable storage medium of claim 7, wherein the database system is in production use during execution of the online defragmentation.

13. A system, comprising:

a computing device; and a computer-readable storage device coupled to the computing device and having instructions stored thereon which, when executed by the computing device, cause the computing device to perform operations for online defragmentation of memory in database systems, the operations comprising:

defining a set of marked pages comprising one or more sparse pages having respective data records that are to be deleted during online defragmentation;

applying an intent exclusive lock (IX-lock) to each of one or more tables having data stored in a marked page in the set of marked pages, the IX-lock enabling a first set of transactions to be executed on data stored in each marked page and prohibiting a second set of transactions to be executed on data stored in each marked page;

generating a record map comprising key-value pairs, each key-value pair being associated with a respective record location in one of the marked pages, a value of each key-value pair being initially set to a first value;

iteratively executing the online defragmentation to delete data from one or more marked pages and add the data to one or more non-sparse pages, at least one iteration comprising applying a try-lock to a record in a marked page;

at one or more iterations of the online defragmentation, updating the record map to change the value of at least one key-value pair from the first value to the second value, the second value representing that data from a record location of a marked page has been deleted from the marked page and added to a non-sparse page; and ceasing execution of the online defragmentation in response to determining that all of the key-value pairs in the record map are equal to the second value.

14. The system of claim 13, wherein defining a set of marked pages comprises:

calculating a utilization for each page of a set of used pages, each used page comprising at least one slot that is used for data storage; and defining a set of sparse pages based on respective utilizations, at least one sparse page in the set of sparse pages being included in the set of marked pages.

15. The system of claim 13, wherein the first set of transactions comprises deleting data from a marked page.

16. The system of claim 13, wherein the second set of transactions comprises allocating at least one slot in a marked page and storing data in the at least one slot.

17. The system of claim 13, wherein after online defragmentation, each of the marked pages is deallocated.

* * * * *